United States Patent [19]
Guest et al.

[11] Patent Number: 5,102,695
[45] Date of Patent: Apr. 7, 1992

[54] HIGHLY TINTABLE ABRASION RESISTANT COATINGS

[75] Inventors: Allen M. Guest, Chino; Martin W. Preus, Anaheim; William Lewis, Tustin, all of Calif.

[73] Assignee: Swedlow, Inc., Garden Grove, Calif.

[21] Appl. No.: 614,841

[22] Filed: Nov. 14, 1990

Related U.S. Application Data

[63] Continuation-in-part of Ser. No. 376,692, Jul. 7, 1989, Pat. No. 5,013,608.

[51] Int. Cl.$^5$ ............................................... B05D 5/06
[52] U.S. Cl. .......................................... 427/164; 8/495; 8/496; 427/165; 427/387; 427/393.5; 428/412; 428/480; 428/501; 428/526; 524/267; 524/384; 524/597
[58] Field of Search ............... 8/495, 496; 427/164, 427/165, 387, 393.5; 428/412, 436, 480, 501, 521; 524/267, 359, 597

[56] References Cited

U.S. PATENT DOCUMENTS

| | | | |
|---|---|---|---|
| 4,218,508 | 8/1980 | Humphrey, Jr. | 428/331 |
| 4,232,088 | 11/1980 | Humphrey, Jr. | 428/412 |
| 4,275,118 | 6/1981 | Baney | 428/412 |
| 4,299,746 | 11/1981 | Frye | 106/287.13 X |
| 4,339,503 | 7/1982 | Rukavina | 428/412 |
| 4,353,959 | 10/1982 | Olson | 428/331 |
| 4,355,135 | 10/1982 | January | 524/767 |
| 4,410,594 | 10/1983 | Olson | 428/412 |
| 4,439,494 | 3/1984 | Olson | 428/412 |
| 4,476,281 | 10/1984 | Vaughn, Jr. | 524/767 |
| 4,680,232 | 7/1987 | Factor | 428/412 |
| 4,799,963 | 1/1989 | Basil | 106/287.13 |
| 4,842,941 | 6/1989 | Devins et al. | 428/412 |

*Primary Examiner*—Michael Lusignan
*Attorney, Agent, or Firm*—Pretty, Schroeder, Brueggemann & Clark

[57] ABSTRACT

Clear, abrasion resistant, tintable coating compositions which are based on siloxane/silica hybrid coating resins and which also contain at least about 3 weight percent and up to about 30 weight percent of a tintability enhancing compound comprising at least one alkylated amine formadehyde compound. These coating compositions are especially useful for providing both abrasion resistance and high levels of tinting.

40 Claims, No Drawings

HIGHLY TINTABLE ABRASION RESISTANT COATINGS

This application is a continuation-in-part of copending application Ser. No. 376,692 filed on July 7, 1989, now U.S. Pat. No. 5,013,608.

BACKGROUND OF THE INVENTION

The present invention relates to tintable, abrasion resistant coatings for solid substrates. The substrates are generally substantially transparent to at least some wavelengths of visible light. The cured coatings of the invention simultaneously resist abrasion and provide superior tintability.

DESCRIPTION OF RELATED ART

Many solid substrates, especially clear, transparent plastic materials, have been used as substitutes for glass in many applications. The reasons for this substitution are the unique properties of the plastics, such as weight, ease of handling, and ease of formation of articles.

Plastic materials are not without shortcomings, however, as most plastics are soft and scratch quite readily. To enable the use of plastics in some applications, it has been customary to coat the plastics with organic or siloxane coatings. These coatings preferably are clear, unpigmented coatings. An example of such an organic coating is a heat curable polyurethane resin. Because polyurethane coatings are less expensive, they are considered to be acceptable for coating plastic materials to render them abrasion resistant even though the abrasion resistance of polyurethane coatings is not as good as some siloxane-based coatings.

In order to provide exceptionally hard abrasion resistant coatings to the plastic article manufacturers, new siloxane-based curable resin systems were developed. An example of such a resin system can be found in U.S. Pat. No. 3,986,997. These siloxane resins have been very successful as coatings for plastic lenses, sheets, and other articles. These coatings, however, have the major drawback that, after curing, they are not tintable.

It is often desirable for an end application of plastic materials that the abrasion resistant coatings applied thereto be tintable. Such uses, for example, include plastic sunglass lenses. It would be highly desirable, therefore, to find a method for tinting known resins, or to develop a new resin system in which the cured coating is tintable and, at the same time, provides excellent abrasion resistant properties such as that found in siloxane-based coatings.

Others have attempted to produce tintable, abrasion resistant coatings with limited success. For example, U.S. Pat. No. 4,355,135 to January, is directed to a tintable abrasion resistant coating composition for lenses. The coating compositions were tested by measuring the light transmission through the coated lens after immersion in a dye bath for 5, 15 and 30 minutes. While these compositions are tintable, they do not, however, provide the level or speed of tinting desired in many applications.

Accordingly, the need exists for a single coating composition that, when cured, can accomplish the objectives of high tintability with significant resistance to abrasion.

SUMMARY OF THE INVENTION

It is, therefore, an object of this invention to provide a single coating composition that can provide both resistance to abrasion and improved tintability when cured. An additional object of the invention is to provide a process for making the tintable coating composition, for coating a solid with the tintable coating composition of the invention, and to provide a substrate coated with the tintable coating composition of the invention.

These and other objects of the present invention are achieved through a coating composition containing from at least about 3 percent up to about 30 percent by weight of coating solids of a tintability enhancing compound in a base resin comprising an aqueous, aqueous-alcoholic, or alcoholic dispersion of colloidal silica, or of a mixture of colloidal silica with one or more colloidal metal oxides, and a partial condensate of an epoxy-functional silanol which is preferably blended with a partial condensate of another silanol. A crosslinking agent and a curing catalyst are added to form the highly tintable abrasion resistant coating compositions of the present invention.

The tintability enhancing compounds comprise at least one alkylated amine formaldehyde compound. Preferred alkylated amine formaldehyde compounds include methylated urea formaldehyde compounds, butylated urea formaldehyde compounds, methylated melamine formaldehyde compounds, methylated/ethylated glycouril formaldehyde compounds, and mixtures thereof. Surprisingly, the coating compositions of the invention are capable of incorporating up to about 30 percent by weight, based on coating solids, of the tintability enhancing compounds without significant deterioration in the physical properties of the cured coating. Preferably, the tintability enhancing compound is present in an amount between about 5 percent to about 20 percent by weight, based on coating solids. Such coating compositions have both excellent abrasion resistance and excellent tintability.

The process for making the coating composition of the invention comprises mixing an aqueous, aqueous-alcoholic, or alcoholic dispersion of colloidal silica, or of a mixture of colloidal silica with one or more colloidal metal oxides, with a partial condensate of an epoxy-functional silanol which is preferably blended with a partial condensate of another silanol, and adding a crosslinking agent, a curing catalyst, and from at least about 3 percent up to about 30 percent by weight of a tintability enhancing compound comprising at least one alkylated amine formaldehyde compound, such as a mixture of a methylated urea formaldehyde compound with a butylated urea formaldehyde compound. The prepared coating composition is applied to at least one face of a substrate such as glass or plastic and cured by exposure to heat, light, an electron beam or some other curing agent. The coated substrate may then be exposed to a conventional tinting process to tint the cured coating.

DETAILED DESCRIPTION OF THE INVENTION

The present invention comprises a tintable, curable, abrasion resistant coating composition. The composition comprises:

(A) a base resin consisting of an aqueous-alcoholic dispersion of (1) about 5 to about 75 weight percent solids, based on the total solids content of (A), of colloidal silica or a mixture of colloidal silica with a colloidal metal oxide;

(2) 0 to about 50 weight percent, based on the total solids content of (A), of a partial condensate of a silanol or a blend of silanols which is selected from a group consisting of silanols having the formula (a) $R^1Si(OH)_3$ wherein $R^1$ is methyl, and (b) $R^2Si(OH)_3$ wherein $R^2$ is selected from the group consisting of vinyl, allyl, phenyl, ethyl, propyl, 3,3,3-trifluoropropyl, gamma-methacryloxypropyl, gamma-mercaptopropyl, and gamma-chloropropyl and wherein, when (b) is selected, the amount of (b) in (A) cannot exceed about 10 weight percent based on the total solids content of (A);

(3) about 10 to about 55 weight percent, based on the total solids content of (A), of a partial condensate of a silanol of the formula $R^3Si(OH)_3$ wherein $R^3$ is selected from the group consisting of epoxy-functional compounds and mixtures thereof, preferably, (a)

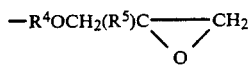

wherein $R^4$ is an alkylene radical containing 1 to 4 carbon atoms and $R^5$ is a hydrogen atom or an alkyl radical of 1 to 2 carbon atoms, and (b)

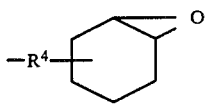

wherein $R^4$ has the meaning set forth above;
(B) a crosslinker for (A);
(C) a curing catalyst; and
(D) at least about 3 percent and up to about 30 percent by weight, based on the total solids content of (A), (B), (C) and (D), of a tintability enhancing compound comprising at least one alkylated amine formaldehyde compound.

The coating compositions described above may be used alone or in conjunction with other abrasion resistant coating compositions. The dilution of the coating composition of the present invention in other abrasion resistant coating compositions, however, should be controlled so that the tintability of the coating does not fall below a desired level.

The present invention also comprises a process for coating solid substrates with the compositions described herein. The process comprises coating a solid substrate with the coating composition of the invention and thereafter curing the composition on the substrate by first evaporating the solvent and then heating to temperatures of 50° C. or higher. The coating composition may also be cured by light or electron beam radiation. A third aspect of the present invention is a solid substrate coated by the composition of the invention.

The base resin (A) of the present invention comprises three components: (A)(1) is colloidal silica, alone or in combination with a metal oxide colloid; (A)(2) is a partial condensate of a silanol of the formula $R^1Si(OH)_3$ or $R^2Si(OH)_3$, or both; and (A)(3) is a partial condensate of a silanol of the formula $R^3Si(OH)_3$. For purposes of this invention, the term "colloidal silica" refers to stable dispersions or solutions of discrete particles of amorphous silica. This term excludes solutions of polysilicic acid in which the polymer molecules or particles are so small that they are not stable. Such solutions, which can be obtained by acidifying sodium silicate solutions or by hydrolyzing silicon esters or halides at ordinary temperatures, can be used herein provided their size is increased either by polymerization or aggregation such that the average particle size is about 1 to about 150 millimicrons in diameter. Preferred for this invention are commercial aqueous colloidal silica dispersions having a particle size in the range of about 5 to about 100 millimicrons in diameter. These silica dispersions are well-known commercial dispersions and are sold under such registered trademarks as "Ludox" and "Nalcoag". Alternatively, alcoholic or other organic dispersions of colloidal silica may also be used. It is preferred to use colloidal silica of about 10 to about 30 millimicrons in diameter particle size in order to obtain the greatest stability. This component is generally used at about 5 to about 75 weight percent solids based on the total solids content of the base resin (A).

The metal oxide colloids which can be dispersed in the aqueous/alcohol solution in combination with the colloidal silica include antimony, cerium, and titanium oxides. A suitable colloidal antimony oxide is commercially available under the tradename "Nyacol A15-10LP" from Nyacol, Inc. in Ashland, Mass. Colloidal metal oxide dispersions function to improve the hardness of the coating and may also assist in absorbing ultraviolet light. Similar colloidal dispersions of other metal salts are expected to be suitable in the practice of this invention and obvious to one having ordinary skill in the art. The common characteristic of these colloidal dispersions is that the dispersant is water insoluble.

Preferably, the base resin includes as a second component a partial condensate of a silanol or a blend of silanols having the formula $R^1Si(OH)_3$ or $R^2Si(OH)_3$, or both. When the silanol has the formula $R^1Si(OH)_3$, $R^1$ is methyl. When the silanol has the formula $R^2Si(OH)_3$, $R^2$ is selected from the radicals 3,3,3-trifluoropropyl, vinyl, allyl, phenyl, ethyl, propyl, gamma-methacryloxypropyl, gamma-mercaptopropyl, and gamma-chloropropyl, provided that when the silanol includes $R^2Si(OH)_3$, the amount of this silanol in (A) cannot exceed about 10 weight percent based on the total solids content of (A). This second component is generally used at 0 to about 50 weight percent based on the total solids content of (A).

The third component of the base resin (A) is a partial condensate of a silanol of the formula $R^3Si(OH)_3$ wherein $R^3$ is selected from the group consisting of epoxy-functional compounds and mixtures thereof. Preferred epoxy-functional compounds are selected from the two groups consisting of (a), a radical having the formula:

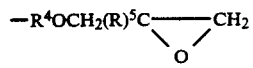

and (b) a radical having the formula

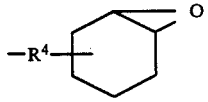

wherein $R^4$ is an alkylene radical containing 1 to 4 carbon atoms and $R^5$ is a hydrogen atom or an alkyl radical of 1 or 2 carbon atoms. It should be noted that the common feature of these two groups is the presence in each of the epoxy functionality. This component is generally used at about 10 to about 55 weight percent based on the total solids content of (A).

Most preferred for this invention is a base resin which contains from about 30 to about 70 weight percent of (A)(1), from about 5 to about 25 weight percent of (A)(2), and from about 20 to about 40 weight percent of (A)(3), all based upon the total solids content of (A).

The colloidal silica and metal oxide colloids used in this invention are preferably aqueous suspensions and the inventive compositions are preferably aqueous-alcoholic dispersions. The preparation of the base resin (A) is, therefore, carried out in an aqueous media. Because the starting materials are prepared from esters, alcohols are generally part of the solvent system. The partial condensates set forth above as (A)(2) and (A)(3) are obtained from the condensation of $R^1Si(OH)_3$ or $R^2Si(OH)_3$, or both, and $R^3Si(OH)_3$, which in turn are usually obtained from precursor trialkoxysilanes, for example $R^1Si(OCH_3)_3$ and $R^2Si(OCH_3)_3$. As described in detail in U.S. Pat. No. 4,355,135 to January, $R^1Si(OH)_3$, $R^2Si(OH)_3$ and $R^3Si(OH)_3$ are preferably generated in-situ by adding the corresponding trialkoxysilanes to aqueous dispersions of colloidal silica. Suitable trialkoxysilanes include those containing methoxy, ethoxy, propoxy and butoxy substituents which, upon hydrolysis in the aqueous medium, liberate the corresponding alcohols, thus generating at least a portion of the alcohol present in the base resin. Alcohol can be added to the hydrolysis medium prior to the addition of the alkoxysilanes, and mixtures of alcohols can be used herein.

Upon generation of the silanols in the aqueous medium, there is condensation of the hydroxyl groups to form siloxane bonds. Sometimes, the hydrolysis and condensation reactions can be enhanced by the addition of small amounts of acids. The condensation does not go to completion but, instead, there are a great number of hydroxyl groups on the siloxane. Optionally, it is sometimes desirable to utilize other water-soluble or water-miscible solvents in this invention, such as ketones, Cellosolves and Dowanols. Dowanols include glycol monoethers, and are manufactured by The Dow Chemical Co., Midland, Mich., U.S.A.

The final base resin solution should preferably contain about 10 to about 50 weight percent solids and may comprise either acidic or alkaline silica dispersions. More preferably, the base resin solution should contain from about 10 to about 30 weight percent solids depending on the desired consistency of the final composition.

The order of addition and hydrolysis of the components of the base resin is not critical, but more favorable properties in the base resin solution, and ultimately in the cured coating made from such a resin, are enhanced when the alkoxy-silanes of components (A)(2) and (A)(3) are combined and added to the aqueous or aqueous-alcoholic silica solution at room temperature. The base resin (A) can be used immediately after preparation or it can be stored. Sometimes, the properties of the cured film can be optimized if the base resin is allowed to age. Aging can take place slowly at room temperature over several days or aging can be shortened by heating the base resin.

Examples of the trialkoxysilane precursors of components A(2)(a) and (b) are such silanes as:

$CH_3Si(OCH_3)_3$,     $C_6H_5Si(OCH_3)_3$,
$CH_3(CH_2)_2Si(OCH_3)_3$,
$CH_2=CHSi(OCH_3)_3$,     $CH_3Si(OCH_2CH_3)_3$,
$C_6H_5Si(OCH_2CH_3)_3$,     $HS(CH_2)_3Si(OCH_3)_3$,
$Cl(CH_2)_3Si(OCH_3)_3$ and

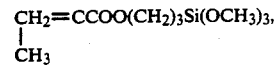

Examples of the trialkoxysilane precursors of component A(3) are

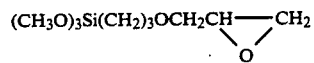

and

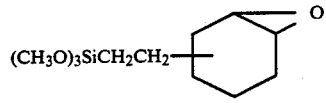

After the base resin is formed, it is mixed with components (B), (C) and (D). The order of addition of components (B), (C) and (D) to component (A) is not critical. It is, however, important that components (B), (C) and (D) are compatible with the base resin and that components (B), (C) and (D) are uniformly distributed in component (A). Non-uniformity of the mix or incompatibility of (B), (C) or (D) in (A) causes non-uniform cured films containing blotches, opaque spots or both.

Component (B), the crosslinker, is selected from the group consisting of (1) polyfunctional carboxylic acids; (2) polyfunctional anhydrides; and (3) polyfunctional imides. The amount of component (B) that is useful in this invention is based on the amount of component (A)(3) used in the invention, that is, on the equivalents of epoxy contained in (A). Thus, for example, in the case of the polyfunctional acids, (B)(l), enough acid is added to the resin to react with from about 25 to about 300 percent of the available epoxy groups in component (A). Preferred for this invention is an amount of (B) containing enough reactive acid, anhydride or imide, to react with from about 25 to about 200 percent of the epoxy groups in (A). These amounts are further limited by the solubility of component (B) in component (A). In those cases where component (B) is completely insoluble in component (A), the cured film is not aesthetically pleasing and the tinting is irregular. In the present invention, some of component (B) materials are highly soluble in the base resin (A) and some are sparingly soluble in base resin (A). All such materials are considered within the scope of this invention, however, because even those materials used as component (B) that are sparingly soluble still lend valuable properties to the resins. As long as such materials are soluble in base resin (A) and as long as a curable, tintable hard film results, such materials are considered within the scope of this invention. Generally, component (B) is useful in this invention at about 0.1 to about 15 weight percent based on the weight of (A), (B) and (C).

Examples of group (1) of component (B) are such compounds as itaconic, succinic, malonic, glutaric, adipic, pimelic, suberic, azelaic and sebacic acids, and unsaturated dibasic acids such as fumeric and maleic. Examples of group (2) of component (B) include such compounds as the cyclic anhydrides of the above mentioned dibasic acids such as succinic anhydride, glutaric anhydride, trimellitic anhydride, pyromellitic anhydride, phthalic anhydride and maleic anhydride. Examples of group (3) of component (B) include such compounds as succinimide, phthalimide, glutarimide and maleimide.

The third component, (C), of this invention is a curing catalyst. For purposes of this invention, the catalyst can be selected from the group consisting of (1) metal acetylacetonates; (2) diamides; (3) imidazoles; (4) amines; (5) organic sulfonic acids and their amine salts and (6) alkali metal salts of carboxylic acids. Thus, examples of such catalysts include, for group (1), such compounds as aluminum, zinc, iron and cobalt acetylacetonates; for group (2), such compounds as dicyandiamide; for group (3), such compounds as 2-methylimidazole, 2-ethyl-4-methy-limidazole and 1-cyanoethyl-2-propylimidazole; for group (4), such compounds as benzyldimethylamine, and 1,2-diaminocyclohexane; for group (5), such compounds as trifluoromethanesulfonic acid; and for group (6), such compounds as sodium acetate. For purposes of this invention, it has been found that from about 0.05 to about 5 weight percent based on the total solids in the coating composition of the catalysts described herein will cause the composition to cure. Larger amounts of such catalysts do not appear to enhance the properties of the film and such unnecessarily large quantities constitute a waste of materials.

The tintability enhancing compound, ingredient (D), comprises at least one alkylated amine formaldehyde compound. Preferred commercially available alkylated amine formaldehyde compounds include BEETLE 65 (a methylated urea formaldehyde compound) and BEETLE 80 (a butylated urea formaldehyde compound), both of which are available from American Cyanamide in Wayne, N.J.; RESIMENE 747 (a methylated melamine formaldehyde compound) available from Monsanto Chemical Company in St. Louis, Mo.; and CYMEL 1171 (a methylated/ethylated glycouril formaldehyde compound), also available from American Cyanamide in Wayne, N.J. While it is believed that other alkylated urea formaldehyde compounds will work satisfactorily in the coating compositions of the present invention, in particular the ethylated and the propylated urea formaldehyde compounds, only the methylated and the butylated urea formaldehyde compounds are known to be commercially available at the present time.

The tintability enhancing compounds used in the coating compositions of the present invention can be used singly or in combination to enhance the ability of the cured coating to absorb, or transmit to the substrate, dye in a tinting operation without sacrificing the excellent abrasion resistance of the unmodified coating. The mechanism for the enhancement of tinting is not well understood, but excellent results can be obtained.

Rapid tinting may be achieved with the addition of a minimum of at least about 3 percent by weight, based on total coating solids, up to about 30 percent by weight of the tintability enhancing compound. Such coating compositions, when cured, provide a balance between superior tintability and excellent abrasion resistance, and it is possible to tailor the coating compositions of the present invention to meet particular needs. If greater tinting performance is desired, the addition of more than 30 weight percent of the tintability enhancing compound may provide coating compositions acceptable for some uses. However, increasing the amount of the tintability enhancing compound above 30 weight percent would be expected at some point to affect deleteriously the level of abrasion resistance.

In addition, it has been discovered that when BEETLE 80, a butylated urea formaldehyde compound, is added to SILVUE ® 339, a colloidal silica filled siloxane coating composition available from SDC Coatings Inc. in Anaheim, Calif., in amounts above ten weight percent, an unacceptably high initial haze level may result which tends to decrease rapidly over time. However, when the amount of BEETLE 80 exceeds about twenty weight percent, it may be necessary for the coating solution to be aged for 1 to 8 weeks at a temperature from 80° to 140° F. (27° to 60° C.) and filtered to produce the desired clear, low haze, highly tintable coating of the present invention. The length of the aging period decreases at higher temperatures and appears to be related in some manner to the age of the SILVUE ® 339 solution to which the BEETLE 80 was added. This phenomenon may also be experienced with the addition of other alkylated amine formaldehyde compounds.

Preferably, the tintability enhancing compound is present in an amount between about 5 percent to about 20 percent by weight, based on total coating solids. A particularly preferred mixture is a combination of up to 20% by weight BEETLE 65 with up to 10% by weight BEETLE 80.

After the base resin is prepared and the components (B), (C) and (D) are added, the composition is shelf stable and can be stored at room temperature for weeks. The composition can be stored at 40° F. (4° C.) to prolong storage stability.

When coating a substrate, the substrate is cleaned using techniques known in the art and then primed, if desired, with a preliminary coating, and the coating composition of the invention is then applied to the substrate. The invention does not exclude the presence of a primer coat with or without an added ultraviolet absorber. Coating can be accomplished by common coating methods such as dip coating, spraying, brushing, spin coating, roller coating, flow coating or cascading. Dip coating and other coating techniques that coat both sides of a substrate may also be used, or single side coating techniques may be repeated on the other side of a substrate if desired. These various methods of coating allow the coating to be placed on at least one side of the substrate at variable thicknesses, thus allowing a wider range of uses of the coating. Ordinarily, the coating compositions of this invention perform best when the cured coating is in the range of about 1 to about 10 microns thick. Thicknesses in this range allow optimum tinting in shorter times without impairing the optical clarity of the coated substrates such as by, e.g., cracking.

The coating composition and substrate are normally heated to expedite curing. Temperatures in the range of 50° C. to 150° C. can be used for most plastic substrates, provided that the time of curing and the temperature do not combine to soften and distort a selected plastic substrate. Therefore, a temperature of 80° C. to 130° C. is preferred.

The coating composition is useful when placed on a glass substrate as well as plastic. If the substrate is glass, higher curing temperatures may be used. Useful plastic substrates include, but are not limited to, polycarbonate, acrylic, CR-39, i.e., poly(diethylene glycol bis allyl carbonate), polyesters, cellulose acetate butyrate, and acrylonitrile-butadiene-styrene. Other substrates may also be used, such as copolymers of the substrates listed above, and substrates such as wood, fabric, leather, paper, or metal.

When a tinted coating is desired, the surface of a substrate coated with a cured coating of the present invention is immersed in a heated dye bath containing a suitable colored dye, e.g., BPI Sun Gray or BPI Black, both of which are dyes sold by Brain Power Incorporated of Miami, Fla. The dye solution is prepared by diluting one part of the BPI dye concentrate to ten parts water, and then heating the resulting solution to a temperature in the range of about 88° to 100° C., while constantly stirring the solution. The coated surface of the substrate is preferably cleaned by wiping with a compatible solvent prior to immersion in the dye bath for a period of time sufficient to absorb or transmit the desired amount of dye, then washed with distilled water to remove the excess dye and blotted dry. The intensity of the tint can be adjusted by varying the thickness of the coating or the time immersed in the dye bath. The degree of tint obtained can be determined by using a colorimeter, such as a Gardner XL-835, which measures the percent of light transmittance.

A significant property of the coating composition of the present invention is that a high amount of dye can be absorbed or transmitted to the substrate within a reasonable length of time. For example, in the ophthalmic industry two levels of light transmittance ("LT") are generally used in connection with the application of tints to lenses for eyeglasses. A 50 percent light transmittance means that the amount of dye absorbed or transmitted is sufficient to allow only 50 percent of the light to pass through the tinted lens. This is generally the level of light transmittance applicable to "fashion" tints for eyeglasses. A darker tint such as that used for sunglasses generally has about 20 percent light transmittance which means that the amount of dye absorbed or transmitted allows only 20 percent of the light to pass through the lens. One particular type of plastic commonly used in the ophthalmic industry to make lenses, CR-39, generally will tint to 20 percent LT in approximately 15 minutes. Accordingly, it is desirable to achieve a 20 percent LT with a coated lens within 15-30 minutes under standard conditions.

Coatings using the present invention may be used to protect substrates or items protected by a substrate in many different fields. Protecting eyeglass lenses, windows or interiors in vehicles or in buildings, either by direct application to the substrate or through coating a film and then applying the film to the substrate, are all methods for using the invention.

Other additives can be added to the inventive compositions in order to enhance the usefulness of the coatings. For example, surfactants, antioxidants, ultraviolet absorbers, and the like, can be included herein.

As stated above, the coating compositions of the present invention are silica-based due to the condensation of colloidal silica and the various hydrolyzable silanes. Those skilled in the art will recognize that the relative weight percent of the colloidal silica can be varied in proportion with the remaining coating composition ingredients. The silica content can be adjusted by varying the relative amounts of the constituent components. This adjustment in silica content will, in turn, influence the physical properties of the cured coating. For example, abrasion resistance is directly related to the percent silica content, but is inversely related to the $\Delta\%H$, which is a quantitative measure of abrasion resistance on coated products according to the Taber Abrasion Resistance test, ASTM No. D 1044. That is to say, as the silica content becomes a greater percentage of the total solids in the cured coating, the value of $\Delta\%H$ will decrease for that particular coating. It will be recognized that such lower values of $\Delta\%H$ indicate improved abrasion resistance for those coatings. Generally, coatings having acceptable abrasion resistance have a $\Delta H_{500}$ (i.e., after 500 cycles) of less than about 15%.

In order to more fully and clearly describe the present invention so that those skilled in the art may better understand how to practice the present invention, the following examples are given. These are intended to illustrate the invention and should not be construed as limiting the invention disclosed and claimed herein in any manner. In each example, all parts are by weight.

TESTING METHODS

Tinting Test

The lenses were tinted using commercially available dyes from Brain Power, Inc., Miami, Fla., U.S.A., namely, BPI Sun Gray and BPI Black dyes. The tinting was carried out at either about 88° C. or about 96° C. by immersing the lenses into the dye bath for up to 30 minutes. In the tables of the examples, the indicated properties are measured after the indicated number of minutes of total lens immersion. The lower the percent of light transmitted, the greater is the amount of dye absorbed or transmitted to the lens by the coating during the selected time period.

The degree of tint obtained as shown by the percent of light transmission through the lens was measured using a Gardner XL-835 colorimeter manufactured by Gardner Laboratory, Inc., Bethesda, MD., U.S.A., and is reported as percent transmission. The colorimeter also measures the degree of yellowness and the amount of haze in the coating, both of which are also reported in the tables. Typically, less than 1% haze is not visible to the naked eye, while more than 1.5% haze is generally objectionable as the optical clarity of the coated lens becomes affected.

Taber Abrasion Resistance Test

Abrasion resistance was measured using the Taber Abrasion Resistance Test, ASTM No. D 1044. The Taber Abraser generates the increase in haze after being subject to 100 and 500 cycles of an abrasive CF-10 wheel. Results are reported as percent change in haze ($\Delta\%H$).

Coating Adhesion Test

The adhesion of the cured coating to the substrate was measured using the crosshatch adhesion test, ASTM No. D 3359. This involves scribing a criss-cross pattern (grid) on the coated surface, applying a 3M 600 tape, and pulling it away sharply in one quick motion.

Three tape pulls with no adhesion loss is considered passing, and is reported as 100% adhesion.

EXAMPLE 1

To show the unexpected and surprising tinting improvement of the coating compositions of the present invention, two controls were prepared for comparison purposes using a LEXAN LS2-111 transparent polycarbonate substrate, available from General Electric Company in Schenectady, N.Y., which had been primed by dip coating the substrate into SP-6862 primer, available from SDC Coatings, Inc. in Anaheim, Calif., then air dried for ten minutes before heating at 121° C. for 25 minutes. For Sample 1(a), the primed substrate was flow coated on both sides with unmodified SILVUE ® 339, a commercially available coating composition from SDC Coatings, Inc., which is made in accordance with the teachings of the January patent, U.S. Pat. No. 4,355,135. SILVUE ® 339 is a colloidal silica filled siloxane coating based on methyltrimethoxysilane and gammaglycidoxypropyltrimethoxysilane. Sample 1(b) was an uncoated, unprimed LS2-111 polycarbonate substrate.

To demonstrate the improved tintability of the coating compositions of the present invention, primed substrates made from LEXAN LS2-111 transparent polycarbonate were prepared as set forth above. The primed substrates were flow coated on both sides with a coating composition of the present invention comprising a mixture of SILVUE ® 339 with the following tintability enhancing compounds (all amounts are percent by weight of total final solids):

1(c) 5% BEETLE 80;
1(d) 10% BEETLE 80;
1(e) 5% BEETLE 65.

Each of the coated substrates was cured in an oven for 4 hours at a temperature of 240° F. (116° C.) and then allowed to cool to room temperature, at which time the thickness of the cured coating was measured. The initial percent light transmission, yellowness index and percent haze were measured before immersion into the dye bath. The substrates were then immersed into a BPI Black colored dye bath (1:10 dilution) heated to about 96° C. Coating tintability was tested by measuring the change in light transmittance (L.T.) resulting from immersion in the dye bath after 5, 15 and 20 minutes. As the results in Table I show, the coating compositions containing the tintability enhancing compounds of the present invention had demonstrably superior tintability than the coated controls. The substrate coated with unmodified SILVUE ® 339 (sample 1(a)) had slightly reduced light transmission as compared to the uncoated substrate (sample 1(b)).

TABLE I

|  | 1(a) | 1(b) | 1(c) | 1(d) | 1(e) |
|---|---|---|---|---|---|
| Coating Thickn., microns | 5.37 | n/a | 5.42 | 5.37 | 5.54 |
| Taber Abr. Resist., Δ % H |  |  |  |  |  |
| 100 Revs | 0.6 | — | 1.2 | 0.7 | 0.9 |
| 500 Revs | 3.4 | — | 6.4 | 3.7 | 4.2 |
| Initial Cross Hatch, % Adhesion | 100 | n/a | 100 | 100 | 100 |
| Initial L.T., % | 86.9 | 84.9 | 86.6 | 86.7 | 86.5 |
| Y.I. | 0.4 | 0.1 | 1.0 | 1.7 | 0.7 |
| Haze, % | 0.7 | 0.5 | 0.6 | 1.4 | 0.6 |
| Tint(96° C. BPI Black) |  |  |  |  |  |
| Initial L.T., % | 87.0 | 84.9 | 86.8 | 87.8 | 87.5 |
| 5' L.T., % | 80.9 | 82.5 | 73.1 | 60.3 | 75.6 |
| 15' L.T., % | 74.2 | 81.3 | 61.7 | 49.4 | 64.7 |
| 20' L.T., % | 68.9 | 80.9 | 56.1 | 43.5 | 57.9 |
| Cross Hatch, % Adhesion after 30' Tinting | 100 | n/a | 100 | 100 | 100 |

EXAMPLE 2

Additional samples were prepared in accordance with the present invention using a LEXAN LS2-111 polycarbonate substrate which had been primed by dip coating the substrate into SP-6862 primer, then air dried for ten minutes before heating at 250 F (121° C.) for 30 minutes. The primed substrate was then flow coated on both sides with a coating composition of the present invention comprising a mixture of SILVUE ® 339 with the following tintability enhancing compounds (all amounts are percent by weight of total final solids), which were combined by using moderate agitation at ambient temperatures, then allowed to stand overnight before being applied to the substrate:

2(a) 20% BEETLE 65
2(b) 20% BEETLE 80
2(c) 20% RESIMENE 747
2(d) 20% CYMEL 1171
2(e) none
2(f) uncoated Samples 2(e) and 2(f) were prepared for comparison purposes, with sample 2(e) using unmodified SILVUE ® 339 to coat the primed substrate without the addition of any tintability enhancing compounds, and sample 2(f) being an uncoated control. After coating, each of the samples was air dried for thirty minutes, then cured for four hours at 265° F. (127° C.)

After curing, the initial light transmittance of each coated substrate was measured, as well as the initial coating adhesion and steel wool abrasion resistance. Coating tintability was tested by measuring the change in light transmittance as a function of immersing the substrates in a BPI Black colored dye bath (1:10 dilution), heated to about 96° C., for 45 minutes. As the following results show, each of the alkylated amine formaldehyde compounds effectively increased the tint absorbing properties of the unmodified SILVUE ® 339 coating composition, obtaining deeper tinting characteristics in the final coating while maintaining good coating adhesion and abrasion resistance properties.

TABLE II

|  | 2(a) | 2(b) | 2(c) | 2(d) | 2(e) | 2(f) |
|---|---|---|---|---|---|---|
| Initial Properties |  |  |  |  |  |  |
| L.T., % | 88 | 88 | 88 | 89 | 88 | 87 |
| Coating Adhesion, % | 100 | 100 | 100 | 100 | 100 | n/a |
| Steel Wool Abr. Resist. Rating | Good | Good | Good | Good | Good | Poor |
| Properties After Immersion in BPI Black Dye at 96° C. for 45 min. |  |  |  |  |  |  |
| L.T., % | 52 | 46 | 35 | 20 | 65 | 78 |
| Coating Adhesion, % | 100 | 100 | 100 | 100 | 100 | n/a |

TABLE II-continued

|  | 2(a) | 2(b) | 2(c) | 2(d) | 2(e) | 2(f) |
|---|---|---|---|---|---|---|
| Steel Wool Abr. Resist. Rating | Good | Good | Good | Good | Good | Poor |

EXAMPLE 3

To compare the tinting properties of mixtures of alkylated amine formaldehyde compounds, primed LEXAN LS2-111 substrates were prepared as set forth in the previous examples, and two coating compositions were prepared in accordance with the present invention, the first (sample 3(a)) containing 20 weight percent BEETLE 65 and 10 weight percent BEETLE 80 in SILVUE ® 339, and the second (sample 3(b)) containing 18 weight percent BEETLE 65 and 7 weight percent BEETLE 80 in SILVUE ® 339 (all amounts are percent by weight total final solids). After curing at 260° F. (127° C.) for 4 hours, the coated substrates were immersed into a dye bath containing BPI Black dye (1:10 dilution) at 96° C. (205° F.). For comparison purposes, a substrate coated only with unmodified SILVUE ® 339 (sample 3(c)) and an uncoated substrate (sample 3(d)) were also immersed in the dye bath. As the following data shows, the light transmission of the coating composition of the present invention was significantly reduced after 5, 15, 25, 35 and 45 minutes tinting versus that of the controls, with sample 3(a) showing particularly surprising improvement after 5 and 15 minutes.

TABLE III

| Light Transmittance, % | 3(a) | 3(b) | 3(c) | 3(d) |
|---|---|---|---|---|
| Initial | 92 | 92 | — | 87 |
| 5 min. | 61 | 68 | — | 87 |
| 15 min. | 47 | 54 | 77 | 84 |
| 25 min. | 42 | 47 | — | 82 |
| 35 min. | 38 | 41 | — | 77 |
| 45 min. | 37 | 39 | 65 | 76 |

EXAMPLE 4

To compare the tinting properties of a coating composition of the present invention on different substrates and with different dyes, three different substrates were prepared, the LEXAN LS2-111 primed polycarbonate substrate prepared as explained previously, caustic etched CR-39 polycarbonate substrate, and glass. A sample of each substrate was prepared for immersion in each of three different colored dye baths (1:10 dilution) at the temperatures and for the times shown in the following table. The samples identified as 4(a) were uncoated controls, the samples denominated 4(b) were coated with unmodified SILVUE ® 339, and the samples shown as 4(c) were coated with a coating composition of the present invention comprising 20 weight percent BEETLE 80 in SILVUE ® 339 (all amounts are percent by weight of total final solids). Each coated substrate was cured at 265° F. (129° C.) for 3 hours before immersion in the colored dye bath. As Table IV shows, the coating composition prepared in accordance with the present invention had superior tintability on each substrate for each colored dye after both 15 and 45 minutes.

TABLE IV

| Substrate | Dye Bath Conditions | Light Transmittance, % | | |
|---|---|---|---|---|
|  |  | 4(a) | 4(b) | 4(c) |
| Polycarbonate (primed SP-6862) | Brown, 95° C., | | | |
|  | 15 min. | 80 | 77 | 54 |
|  | 45 min. | 67 | 56 | 43 |
|  | Black, 95° C., | | | |
|  | 15 min. | 84 | 80 | 59 |
|  | 45 min. | 75 | 65 | 46 |
|  | Grey, 95° C., | | | |
|  | 15 min. | 75 | 74 | 55 |
|  | 45 min. | 69 | 55 | 31 |
| CR-39 (Caustic Etched) | Brown, 88° C., | | | |
|  | 15 min. | 17 | 83 | 48 |
|  | 45 min. | 7 | 78 | 27 |
|  | Black, 88° C., | | | |
|  | 15 min. | 12 | 80 | 43 |
|  | 45 min. | 7 | 76 | 23 |
|  | Grey, 88° C., | | | |
|  | 15 min. | 18 | 86 | 54 |
|  | 45 min. | 12 | 78 | 38 |
| Glass | Brown, 95° C., | | | |
|  | 15 min. | 85 | 67 | 45 |
|  | 45 min. | 84 | 42 | 32 |
|  | Black, 95° C., | | | |
|  | 15 min. | 93 | 67 | 44 |
|  | 45 min. | 88 | 61 | 37 |
|  | Grey, 95° C., | | | |
|  | 15 min. | 88 | 60 | 44 |
|  | 45 min. | 86 | 55 | 31 |

Other modifications and variations of the present invention are possible in light of the above teachings. For example, additives and other modifying agents may be added to the compositions of this invention. It is to be understood, however, that changes may be made in the particular embodiments described above which are within the full intended scope of the invention as defined in the appended claims.

We claim:

1. A coating composition which forms a transparent, tintable, abrasion resistant coating upon curing, said coating composition comprising:
   (i) an effective abrasion-resistant amount of a dispersion of a colloidal silica;
   (ii) about 25 to about 95 weight percent solids based upon the total solids of (i) and (ii) of a partial condensate of a silanol or a blend of silanols, wherein when there is just one silanol it is other than methylsilanol; and
   (iii) at least about 3 percent and up to about 30 weight percent based on the total solids of (i), (ii) and (iii) of a tintability enhancing compound comprising at least one alkylated amine formaldehyde compound.

2. The coating composition of claim 1, wherein said partial condensate comprises a blend of an epoxy silanol and methylsilanol.

3. The coating composition of claim 1 wherein said tintability enhancing compound comprises from at least about 5 percent up to about 20 weight percent.

4. The coating composition of claim 1 wherein said tintability enhancing compound comprises a mixture of at least two alkylated amine formaldehyde compounds.

5. The coating composition of claim 4 wherein said mixture comprises up to about 20 weight percent of a methylated urea formaldehyde compound and up to about 10 weight percent of a butylated urea formaldehyde compound.

6. The coating composition of claim 1 wherein a colloidal metal oxide is mixed with the colloidal silica.

7. The coating composition of claim 6 wherein the colloidal metal oxide is antimony oxide.

8. The coating composition of claim 1 wherein the alkylated amine formaldehyde compound is selected from the group consisting of methylated urea formaldehyde compounds, butylated urea formaldehyde compounds, methylated melamine formaldehyde compounds, methylated/ethylated glycouril formaldehyde compounds, and mixtures thereof.

9. A coating composition which forms a transparent, tintable, abrasion resistant coating upon curing, said coating composition comprising:
(A) a base resin comprising:
(1) about 5 to about 75 weight percent solids, based on the total solids of (A), of a dispersion of a colloidal silica;
(2) 0 to about 50 weight percent, based on the total solids of (A), of a partial condensate of a silanol or a blend of silanols selected from the group consisting of silanols having the formula,
(a) $R^1Si(OH)_3$ wherein $R^1$ is methyl, and
(b) $R^2Si(OH)_3$ wherein $R^2$ is selected from the group consisting of vinyl, allyl, phenyl, ethyl, propyl, 3,3,3-trifluoropropyl, gamma-methacryloxypropyl, gamma-mercaptopropyl, gamma-chloropropyl, and mixtures thereof, and wherein when (b) is selected, the amount of (b) in (A) cannot exceed about 10 weight percent based on the total weight of (A);
(3) about 10 to about 55 weight percent, based on the total solids of (A), of a partial condensate of a silanol of the formula $R^3Si(OH)_3$ wherein $R^3$ is selected from the group consisting of epoxy-functional compounds and mixtures thereof;
(B) a crosslinker for (A);
(C) a curing catalyst; and
(D) at least about 3 percent and up to about 30 weight percent, based on the total solids of (A), (B), (C), and (D), of a tintability enhancing compound comprising at least one alkylated amine formaldehyde compound.

10. The coating composition of claim 9 wherein said epoxy-functional compounds are selected from the group consisting of

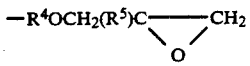

(A)

wherein $R^4$ is an alkylene radical containing 1 to 4 carbon atoms, $R^5$ is a hydrogen atom or an alkyl radical of 1 or 2 carbon atoms, and

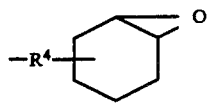

(B)

wherein $R^4$ has the meaning set forth above.

11. The coating composition of claim 10 wherein (A)(1) is present in an amount from about 30 to about 70 weight percent; (A)(2) is present in an amount from about 5 to about 25 weight percent; and (A)(3) is present in an amount from about 20 to about 40 weight percent, all based on the total weight of (A).

12. The coating composition of claim 10 wherein there is also present sufficient component (B) to react with from about 25 to about 200 percent of available epoxy groups in component (A)(3).

13. The coating composition of claim 10 wherein component (C) is present in an amount from about 0.05 to about 5 percent by weight, based on the total solids of (A), (B), (C), and (D).

14. The coating composition of claim 11 wherein component (A)(2) comprises a partial condensate of a blend of methyl and gamma-methacryloxypropyl silanols.

15. The coating composition of claim 11 wherein component (A)(2) Comprises a partial condensate of methylsilanol and (A)(3) comprises a partial condensate of 2-(3,4-epoxycyclohexyl)ethyl silanol or a partial condensate of gamma-glycidoxypropylsilanol.

16. The coating composition of claim 11 wherein component (A)(2) comprises a partial condensate of methylsilanol and (A)(3) comprises a partial condensate of gamma-glycidoxypropylsilanol.

17. The coating composition of claim 12 wherein component (B) is a polycarboxylic acid.

18. The coating composition of claim 13 wherein the catalyst is an amine, a diamide, or an alkali metal salt of a carboxylic acid.

19. The coating composition of claim 10 wherein the alkylated amine formaldehyde compound is selected from the group consisting of methylated urea formaldehyde compounds, butylated urea formaldehyde compounds, methylated melamine formaldehyde compounds, methylated/ethylated glycouril formaldehyde compounds, and mixtures thereof.

20. The coating composition of claim 10 wherein the tintability enhancing compound comprises a mixture of at least two alkylated amine formaldehyde compounds.

21. The coating composition of claim 20 wherein said mixture comprises up to 20 weight percent of a methylated urea formaldehyde compound and up to 10 weight percent of a butylated urea formaldehyde compound.

22. The coating composition of claim 10 wherein the tintability enhancing compound comprises at least about 20 weight percent of a butylated urea formaldehyde compound.

23. The coating composition of claim 10 wherein the tintability enhancing compound comprises about 20 weight percent of a methylated melamine formaldehyde compound.

24. The coating composition of claim 10 wherein the tintability enhancing compound comprises about 20 weight percent of a methylated/ethylated glycouril formaldehyde compound.

25. The coating composition of claim 9 wherein a colloidal metal oxide is mixed with the colloidal silica.

26. The coating composition of claim 25 wherein said colloidal metal oxide is antimony oxide.

27. A coating composition which forms a transparent, tintable, abrasion resistant coating upon curing, said coating composition comprising:
(A) a base resin comprising:
(1) about 30 to about 70 weight percent solids, based on the total solids of (A), of a dispersion of a colloidal silica;
(2) about 5 to about 25 weight percent, based on the total solids of (A), of a partial condensate of a silanol or a blend of silanols selected from the group consisting of silanols having the formula,
(a) $R^1Si(OH)_3$ wherein $R^1$ is methyl, and (b) $R^2Si(OH)_3$ wherein $R^2$ is selected from the group consisting of vinyl, allyl, phenyl, ethyl, propyl, 3,3,3-trifluoropropyl, gamma-methacryloxypropyl, gamma-mercaptopropyl, gamma-chloropropyl, and mixtures thereof, wherein when (b) is selected, the amount of (b) in (A) cannot exceed about 10 weight percent based on the total weight of (A);

(3) about 20 to about 40 weight percent, based on the total solids of (A), of a partial condensate of a silanol of the formula $R^3Si(OH)_3$, wherein $R^3$ is selected from the group consisting of:

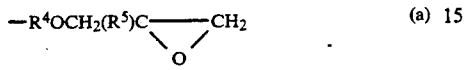 (a)

wherein $R^4$ is an alkylene radical containing 1 to 4 carbon atoms, $R^5$ is a hydrogen atom or an alkyl radical of 1 or 2 carbon atoms, and

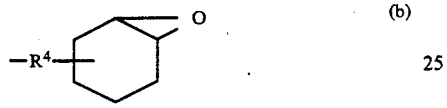 (b)

wherein $R^4$ has the meaning set forth above;
(B) a crosslinker for (A);
(C) a curing catalyst; and
(D) a tintability enhancing compound comprising a mixture of up to 20 weight percent of methylated urea formaldehyde compound and up to 10 weight percent of a butylated urea formaldehyde compound, based upon the total solids in (A), (B), (C), and (D).

28. A process for coating a solid substrate with a transparent, tintable, abrasion resistant coating, said process comprising the steps of:
(i) contacting at least one surface of the solid substrate with a coating composition which forms a transparent, tintable, abrasion resistant coating upon curing, said coating composition comprising:
(A) a base resin comprising
(1) about 5 to about 75 weight percent solids, based on the total solids of (A), of a dispersion of a colloidal silica;
(2) 0 to about 50 weight percent, based on the total solids of (A), of a partial condensate of a silanol or a blend of silanols selected from the group consisting of silanols having the formula,
(a) $R^1Si(OH)_3$ wherein $R^1$ is methyl, and
(b) $R^2Si(OH)_3$ wherein $R^2$ is selected from the group consisting of vinyl, allyl, phenyl, ethyl, propyl, 3,3,3-trifluoropropyl, gamma-methacryloxypropyl, gamma-mercaptopropyl, gamma-chloropropyl, and mixtures thereof, and wherein when (b) is selected, the amount of (b) in (A) cannot exceed about 10 weight percent based on the total weight of (A);
(3) about 10 to about 55 weight percent, based on the total solids of (A), of a partial condensate of a silanol of the formula $R^3Si(OH)_3$ wherein $R^3$ is selected from the group consisting of:

—R⁴OCH₂(R⁵)C———CH₂ (a)
       \\ /
        O wherein $R^4$ is an alkylene radical containing 1 to 4 carbon atoms, $R^5$ is a hydrogen atom or an alkyl radical of 1 or 2 carbon atoms, and —R⁴—⌬—O (b)

wherein $R^4$ has the meaning set forth above;
(B) a crosslinker for (A);
(C) a curing catalyst; and
(D) at least about 3 percent and up to about weight percent, based on the total solids of (A), (B), (C), and (D), of a tintability enhancing compound comprising at least one alkylated amine formaldehyde compound; and
(ii) curing the composition on the solid substrate in a manner such that the cured coating can subsequently be tinted if desired by immersing the coated surface of the substrate in a dye bath for a period of time sufficient for the coating to absorb or transmit to the substrate a desired amount of dye.

29. The process of claim 28, further comprising the step of tinting said coating composition after said composition is cured.

30. The process of claim 28 wherein the alkylated amine formaldehyde compound is selected from the group consisting of methylated urea formaldehyde compounds, butylated urea formaldehyde compounds, methylated melamine formaldehyde compounds, methylated/ethylated glycouril formaldehyde compounds, and mixtures thereof.

31. A coated solid substrate prepared in accordance with the process of claim 28.

32. A coated solid substrate prepared in accordance with the process of claim 28 wherein said solid substrate is transparent.

33. The coated solid substrate of claim 31 wherein the solid substrate is glass.

34. The coated solid substrate of claim 31 wherein the solid substrate comprises a plastic.

35. A process for tinting a transparent, tintable, abrasion-resistant coating that is coated on at least on surface of a solid substrate, said process comprising the steps of:
(i) contacting at least one surface of the solid substrate with a coating composition which forms a transparent, tintable, abrasion-resistant coating upon curing, said coating composition comprising:
(A) A base resin comprising:
(1) about 5 to about 75 weight percent solids, based on the total solids of (A), of a dispersion of a colloidal silica;
(2) about 0 to about 50 weight percent, based on the total solids of (A), of a partial condensate of a silanol or a blend of silanols selected from the group consisting of silanols having the formula,
(a) $R^1Si(OH)_3$ wherein $R^1$ is methyl, and (b) $R^2Si(OH)_3$ wherein $R^2$ is selected from a group consisting of vinyl, allyl, phenyl, ethyl, propyl, 3,3,3-trifluoropropyl, gamma-methacryloxypropyl, gamma-mercaptopropyl, gamma-chloropropyl, and mixtures thereof, and wherein when (b) is selected, the amount of (b) in (A) cannot exceed about 10 weight percent based on the total weight of (A); (3) about 10 to about 55 weight percent, based on the total solids of (A), of a partial condensate of a silanol of the formula $R^3Si(OH)_3$ wherein $R^3$ is selected from the group consisting of:

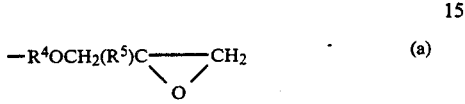
(a)

wherein $R^4$ is an alkylene radical containing 1 to 4 carbon atoms, $R^5$ is a hydrogen atom or an alkyl radical of 1 or 2 carbon atoms, and

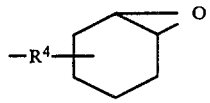
(b)

wherein $R^4$ has the meaning set forth above;

(B) a crosslinker for (A);
(C) a curing catalyst; and
(D) at least about 3 percent and up to about 30 weight percent, based on the total solids of (A), (B), (C), and (D), of a tintability enhancing compound comprising at least one alkylated amine formaldehyde compound;

(ii) curing the coating composition on the solid substrate to form a transparent, tintable, abrasion-resistant coating; and (iii) tinting the cured coating by immersing the coated surface of the solid substrate in a dye bath for a period of time sufficient for the coating to absorb or transmit to the solid substrate a desired amount of dye.

36. A solid substrate having a tinted coating prepared in accordance with the process of claim 35.

37. The solid substrate having a tinted coating of claim 35, wherein the solid substrate is transparent.

38. The solid substrate having a tinted coating of claim 35, wherein the solid substrate is glass.

39. The solid substrate having a tinted coating of claim 35, wherein the solid substrate is a plastic.

40. The sold substrate having a tinted coating of claim 35., wherein the alkylated amine formaldehyde compound is selected from the group consisting of methylated urea formaldehyde compounds, butylated urea formaldehyde compounds, methylated melamine formaldehyde compounds, methylated/ethylated glycouril formaldehyde compounds, and mixtures thereof.

* * * * *

UNITED STATES PATENT AND TRADEMARK OFFICE
CERTIFICATE OF CORRECTION

PATENT NO. : 5,102,695

DATED : April 7, 1992

INVENTOR(S) : Allen M. Guest, Martin W. Preus and William Lewis

It is certified that error appears in the above-identified patent and that said Letters Patent is hereby corrected as shown below:

Title Page:
Abstract, line 6:  "formadehyde" should be -- formaldehyde --

Column 18, line 19: "about weight" should be -- about 30 weight --

Signed and Sealed this

Sixth Day of July, 1993

Attest:

MICHAEL K. KIRK

*Attesting Officer*  *Acting Commissioner of Patents and Trademarks*